United States Patent [19]

Fujimoto

[11] Patent Number: 4,736,131
[45] Date of Patent: Apr. 5, 1988

[54] LINEAR MOTOR DRIVING DEVICE
[75] Inventor: Toshitaka Fujimoto, Tokyo, Japan
[73] Assignee: NEC Corporation, Tokyo, Japan
[21] Appl. No.: 890,676
[22] Filed: Jul. 30, 1986
[30] Foreign Application Priority Data Jul. 30, 1985 [JP] Japan .......................... 60-117471[U]
Nov. 28, 1985 [JP] Japan ................................ 60-183628

[51] Int. Cl.⁴ .......................................... H01L 41/08
[52] U.S. Cl. ................................................... 310/328
[58] Field of Search ............................. 310/323, 328

[56] References Cited
U.S. PATENT DOCUMENTS 3,684,904  8/1972  Galutva ................................. 310/328
4,219,755  8/1980  O'Neill ................................. 310/328
4,408,832 10/1983  Hartman ........................... 310/328 X
4,435,666  3/1984  Fukui et al. ......................... 310/328
4,570,095  2/1986  Uchikawa ........................... 310/328

Primary Examiner—Mark O. Budd
Attorney, Agent, or Firm—Sughrue, Mion, Zinn, Macpeak, and Seas

[57] ABSTRACT

A linear motor driving device includes a pair of actuators each having a first piezoelectric element, a pair of levers connected to the first piezoelectric element, and an apparatus for magnifying the displacement caused by the first piezoelectric element. A second piezoelectric element is connected to the pair of actuators. The second piezoelectric element translates the levers in a direction perpendicular to the direction of actuation of the levers.

8 Claims, 1 Drawing Sheet

U.S. Patent    Apr. 5, 1988    4,736,131
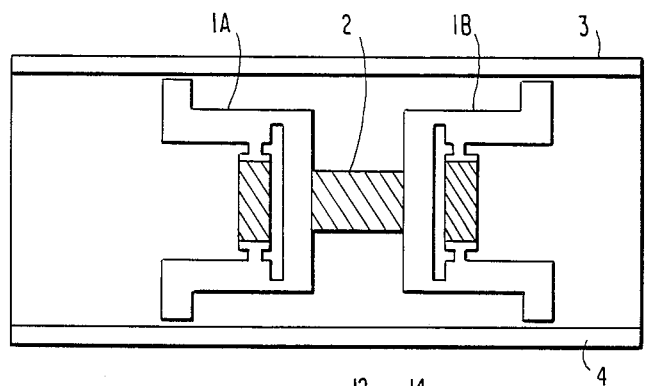
FIG. 1
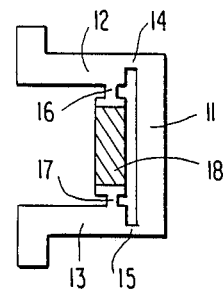
FIG. 2
FIG. 3
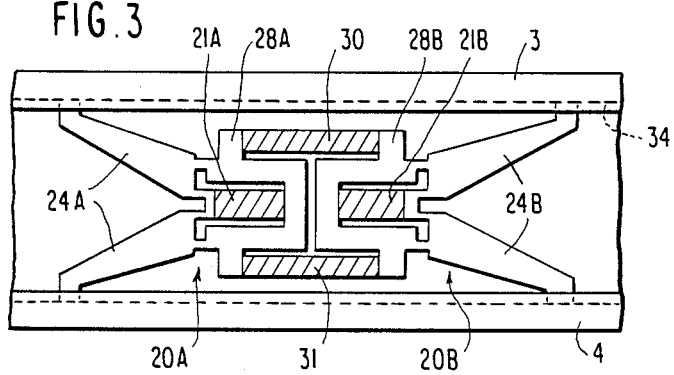
FIG. 4
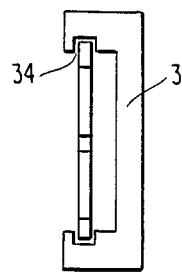
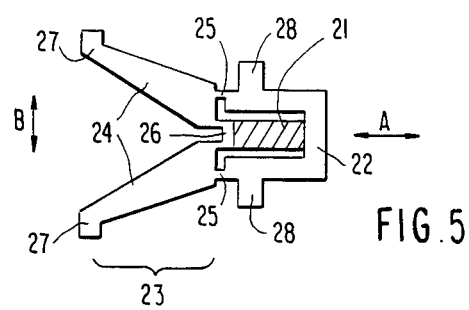
FIG. 5

LINEAR MOTOR DRIVING DEVICE

BACKGROUND OF THE INVENTION

This invention relates to a linear motor driving device, and more particularly to a linear motor driving device using piezoelectric elements as driving power sources.

Electric actuators have been widely used to obtain the linear displacement of a linear motor. Such devices have typically been provided in the form of a combination of an electromagnet and a coil. Such devices are adapted to drive a linear motor by utilizing an induced electromagnetic force.

Of the conventional linear motor driving elements, the electromagnetic linear motor driving element capable of displacing the linear motor in a stepped manner has limited manufacturing accuracy, and, therefore, the positional accuracy thereof has heretofore been limited to only 0.1 mm/step. Moreover, the efficiency of converting the electric energy into mechanical energy is only several percent. Consequently, the power consumption becomes high, and the driving force is small.

SUMMARY OF THE INVENTION

Therefore, it is an object of this invention to provide a stepped displacement type linear motor driving device having higher positional accuracy.

Another object of the invention is to provide a linear motor driving device having low power consumption.

Another object of the invention is to provide a linear motor driving device having a large driving force.

According to the present invention, there is provided a linear motor driving device comprising, a pair of actuators each having a first piezoelectric element, a pair of levers respectively connected to the first piezoelectric elements, means for magnifying the displacement of the first pieozoelectric elements, said magnifying means operating between the levers and the first piezoelectric elements, and a second piezoelectric element connected to the pair of actuators for moving the levers in a direction perpendicular to the direction of lever movement.

Other objects and features will be clarified from the following description, with reference to the attached drawings.

BRIEF DESCRIPTION OF THE DRAWINGS

FIG. 1 shows a front view of one embodiment of the present invention;

FIG. 2 shows a front view of a clamp element used in the embodiment of FIG. 1;

FIG. 3 shows a front view of another embodiment according to the present invention;

FIG. 4 shows a side view of the embodiment shown in FIG. 3;

FIG. 5 shows a front elevation of a clamp element used in the embodiment of FIG. 3.

DESCRIPTION OF THE PREFERRED EMBODIMENTS

FIG. 1 is a longitudinal sectional view of an embodiment of this invention, and FIG. 2 a front elevational view of an example of a clamp element, a constituent element of this embodiment. Referring to FIG. 1, clamp elements 1A, 1B are disposed symmetrically via a multi-layer stack-type piezoelectric ceramic actuator element 2, and are set between parallel plates 3, 4.

Each of the clamp elements 1A, 1B consists as shown in FIG. 2 of levers 11, 12, 13, hinges 14, 15, 16, 17 and a multi-layer piezoelectric ceramic actuator element 18. When an electrical signal is applied to the multi-layer piezoelectric ceramic actuator element 18, an extensional strain occurs therein, and this strain is amplified in accordance with the lever principle via the hinges 16, 17 (the force points), around the hinges 14, 15 (the fulcrums), and via the levers 12, 13, to cause the free end portions of the levers 12, 13 to be pressed outwardly against the parallel plates 3, 4 shown in FIG. 1.

Referring to FIG. 1, the clamp element 1A is first operated to be fixed against the parallel plates 3, 4 by applying an electrical signal to its piezoelectric element 18. An electrical signal is then applied to the piezoelectric ceramic actuator element 2 to generate extensional strain therein. This moves the clamp element 1B to the right in FIG. 1. The clamp element 1B is then operated so as to be fixed against the parallel plates 3, 4. The operation of the clamp element 1A is then interrupted by removing the signal applied to its element 18, to release the clamp 1A. The supply of the electrical signal to the piezoelectric actuator element 2 is then interrupted. This moves the clamp 1A to the right in FIG. 1. The clamp element 1A is then operated to be fixed against the parallel plates 3, 4. The operation of the clamp element 1B is then interrupted. If these operations are repeated sequentially, the actuator which consists of the clamp elements 1A, 1B and piezoelectric ceramic actuator element 2 functions as a linear motor moving along the inner side of the parallel plates in the rightward direction in FIG. 1. If the above-mentioned series of operations are carried out in reverse order, the actuator can also be moved in the leftward direction. If the generation of the actuating electrical signals are appropriately timed, the moving speed of the actuator can be freely selected; moreover, fine positional control to the micrometer level can be carried out.

FIG. 3 is a front elevational view of another embodiment of the linear motor driving device according to this invention, Fig. 4 is a side view of this embodiment, and FIG. 5 is a front view of an example of a clamp element.

As shown in FIG. 5, the clamp elements 20A, 20B constituting the linear motor driving element according to this embodiment consists of a first piezoelectric element 21, a support frame 22 supporting one end of the piezoelectric element 21, and a mechanism 23 for enlarging or magnifying the displacement at the other end of the piezoelectric element 21. The support frame 22 has a substantially C-shaped construction as shown in the drawing, so as to enclose the piezoelectric element, and projections 28 extend from both sides of the support frame 22.

The displacement enlarging mechanism 23 has a pair of legs or levers 24 connected to both ends of the C-shaped support frame 22 via elastically bendable portions 25, and the base end portions of the legs 24 are joined to each other by an elastic portion 26 and also to the opposed end of the piezoelectric element 21. The distance between each of the elastically bendable portions 25 and the elastic portion 26 joined to the piezoelectric element 21 is set sufficiently shorter than, and preferably to around ½–1/15 (in the case of smaller magnification), or around 1/50 (in the case of larger magnification) of that between each of the elastically bendable portions 25 and the free end 27 of the respective leg or lever 24 so that the displacement of the elastic portion 26 causes each of the free ends of the legs to be displaced in an enlarging manner around the respective elastically bendable portions 25.

The above support frame 22 and displacement enlarging mechanism 23 can be formed integrally by punching a sheet of elastic material to the shape shown in FIG. 5.

The piezoelectric element 21 as used in such clamp elements 20A, 20B consists of an element adapted to be extended and contracted in the direction of arrow A. When a voltage is applied to the piezoelectric element 21 to extend the same in the direction of arrow A, the elastic portion 26 is pressed outwardly. As a result, the legs 24 are bent at the elastically bendable portions 25 in the direction such that the legs 24 separate from each other, and the free ends 27 of the legs 24 are displaced so as to project in the direction of arrow B. The small extension and contractions of the piezoelectric element 21 are thus enlarged or magnified to cause the free ends 27 to be greatly displaced, and, in this manner, the direction of displacement of the piezoelectric element 21 is translated by 90°. When the application of voltage to the piezoelectric element 21 is interrupted, it returns to its original state, and the free ends 27 of the legs 24 are displaced toward each other in the direction of the arrow B.

The linear motor driving element according to the device of this embodiment is formed by connecting a pair of clamp elements, described above, to each other in a symmetrical manner as shown in FIG. 3. Referring to FIG. 3, the corresponding parts of the two clamp elements are discriminated from each other by adding "A" and "B" suffixes to the reference numerals.

As is understood from FIG. 3, a pair of clamp elements 20A, 20B are arranged symmetrically so that the legs are positioned outwardly, and second piezoelectric elements 30, 31 are provided between the projections 28A, 28B of the respective clamps elements with both ends of the piezoelectric elements 31 joined to the projections 28A, 28B. The piezoelectric elements 30, 31 are adapted to be extended and contracted in the same direction as the piezoelectric elements 21A, 21B. The free ends of the legs 24A, 24B of the clamp elements are arranged so that they are held in a pair of parallel guide grooves 34 in a guide frame 3.

The piezoelectric elements in the linear motor driving element constructed as described are divided into three groups, i.e. the piezoelectric element 21A, piezoelectric element 21B, and piezoelectric elements 30, 31 and voltage pulse signals are applied to them at different times. This enables the linear motor driving element to be moved within the guide frame 3 in both left and right directions in the drawing.

For example, a voltage is applied to the piezoelectric element 21A in the clamp element 20A to extend the legs 24A thereof and thereby fix the legs 24A in the grooves 34 in the guide frame 3, with no voltage being applied to the piezoelectric element 21B in the clamp element 20B to keep the legs 24B thereof slidable with respect to the guide frame 3. A voltage is then applied to both of the piezoelectric elements 30, 31 to extend the same and thereby increase the distance between the clamp elements 20A, 20B.

Consequently, the free ends of the legs 24B of the clamp element 20B are displaced away from the engaged clamp element 20A, to the right in the figure.

A voltage is then applied to the piezoelectric element 21B in the clamp element 20B to extend the legs 24B thereof and fix the same in the grooves 34 in the guide frame 3. The application of voltage to the piezoelectric element 21 in the clamp element 20A is then interrupted to contract the legs 24A thereof and thereby render the legs 24A slidable with respect to the grooves 34. The application of voltage to both of the piezoelectric elements 31 is then interrupted to contract the same and thereby reduce the distance between the clamp elements 20A, 20B. Consequently, the free ends of the legs 24A of the clamp element 20A are displaced toward the clamp element 20B, again to the right of FIG. 3.

A voltage is then again applied to the piezoelectric element 21A in the clamp element 20A to extend the legs 24A thereof and fix the same in the grooves 34 in the guide frame 3. The application of voltage to the piezoelectric element 21B in the clamp element 20B is then interrupted to contract the legs 24B thereof and thereby render the same slidable with respect to the grooves 34. A voltage is then applied to the two piezoelectric elements 30, 31 to extend the same and thereby increase the distance between the clamp elements 20A, 20B.

If such pulses are repeatedly applied to the piezoelectric elements in the above sequence, or in the reverse sequence, such expansion and contraction operations can be repeatedly carried out, and the linear motor driving element can be moved in "inch worm" fashion.

If the voltage and pulse width of the pulses applied to the piezoelectric elements 30, 31 are suitably selected, the moving distance per step of the linear motor can be varied in the range from several microns to several tens of microns, and the moving speed thereof can range from zero to about 500 mm/sec. Since the piezoelectric elements convert electrical energy to mechanical energy with high efficiency, the power consumption thereof is small, and the driving power thereof is very strong.

As stated above, the device of this embodiment comprises a pair of clamp elements, each of which consists of a first piezoelectric element, and a mechanism for enlarging or magnifying the extension and contraction of the first piezoelectric element in a first direction which is at right angles to the direction in which the first piezoelectric element is extended and contracted; and second piezoelectric elements which are capable of being extended and contracted in a second direction different from the first direction, and which connect the two clamp elements together symmetrically.

When the first piezoelectric elements in this linear motor driving element are energized, the clamp elements are extended in a first direction by the extension and contraction magnifying mechanisms. When the second piezoelectric elements are energized, the clamp elements are thereby extended in a second direction. If such linear motor driving elements are arranged along a guide, and, if the respective piezoelectric elements are energized at various suitable points in time, the linear motor can be displaced linearly in inch worm fashion. Namely, the first piezoelectric element in one clamp element is energized to fix this clamp element to the guide, and the second piezoelectric elements are then extended to increase the distance between the clamp elements. The first piezoelectric element in the second-mentioned clamp element is then energized to fix this clamp element to the guide. The first-mentioned clamp element is then disconnected from the guide to render the former displaceable, and the second piezoelectric elements are then contracted. If these operations are carried out repeatedly, the clamp elements can be moved in a stepped manner along the guide.

As described above, the linear motor driving element according to this device, in which piezoelectric elements and displacement enlarging mechanisms are combined, enable a precise positioning operation to be carried out, and has a small power consumption and large driving force. Such a miniaturized linear motor driving element can be widely used in a floppy disc device, a printer head driving apparatus, an XY plotter, a camera autofocus mechanism, and in robotics.

What is claimed is:

1. A linear motor driving device, comprising:
   a first actuator;
   a second actuator coupled to said first actuator;
   each of said actuators comprising:
   (a) a C-shaped support element having first, second and third legs;
   (b) a first lever hingedly attached to said first leg;
   (c) a second lever hingedly attached to said second leg;
   (d) first piezoelectric element means coupled at a first end to said third leg, said third leg bridging said first and second legs; and
   (e) magnifying means arranged between a second end of said first piezoelectric element means and said first and second levers for enlarging the displacement of said first piezoelectric element means and for actuating said first and second levers; and
   second piezoelectric element means connected between the support elements of said first and second actuators and parallel to said first piezoelectric element means, for moving said first and second actuators apart from each other in a direction substantially perpendicular to the direction of lever movement when said first and second levers are actuated;
   and wherein said first and second piezoelectric element means are disposed in parallel with said first and second legs of support elements, said first piezoelectric elements means and said second piezoelectric element means being at least partially longitudinally overlapping along the lengths thereof, and wherein said third legs of said support elements confront one another, spaced apart by said second piezoelectric element means.

2. A linear motor driving device, comprising;
   a first actuator;
   a second actuator coupled to said first actuator;
   each of said actuators comprising:
   (a) a C-shaped support element having first, second and third legs;
   (b) a first lever hingedly attached to said first leg;
   (c) a second lever hingedly attached to said second leg;
   (d) first piezoelectric element means coupled at a first end to said third leg, said third leg bridging said first and second legs; and
   (e) magnifying means arranged between a second end of said first piezoelectric element means and said first and second levers for enlarging the displacement of said first piezoelectric element means and for actuating said first and second levers; and
   second piezoelectric element means connected between the support elements of said first and second actuators and parallel to said first piezoelectric element means, for moving said first and second actuators apart from each other in a direction substantially perpendicular to the direction of lever movement when said first and second levers are actuated;
   and further including projections provided on said first and second members of said support element, and wherein said second piezoelectric element means comprises a pair of second piezoelectric elements respectively provided between the projections provided on said first legs of said respective actuators, and between the projections provided on said second legs of said respective actuators.

3. A linear motor driving device according to claim 2, wherein said magnifying means includes means for transmitting the displacement of said first piezoelectric element means to said levers in a direction perpendicular to the extension and contraction direction of said first piezoelectric element means.

4. A linear motor driving device according to claim 2, further comprising guide frames for said first and second actuators, said guide frames substantially surrounding said first and second actuators and said second piezoelectric element means, and being engageable with said first and second levers when said levers are actuated.

5. A linear motor driving device according to claim 2, wherein said first and second piezoelectric element means comprise multi-layer stack-type piezoelectric ceramics.

6. A linear motor driving device according to claim 2, wherein said first and second levers and said magnifying means of said actuators are respectively integrally formed of an elastic material.

7. A linear motor driving device according to claim 2, wherein said magnifying means comprises hinge means connected between said first piezoelectric element means and said first and second levers, and being connected to each of said levers at a point near a fulcrum point of each lever, said fulcrum point of each of said levers comprising further hinge means respectively connecting said first and second levers to said first and second legs of said support element.

8. A linear motor driving device according to claim 2, wherein said magnifying means comprises elastic bridge means connecting together first end portions of said first and second levers, said first piezoelectric element means contacting, at its second end, said first and second levers via said bridge means, said bridge means being connected to a portion of each of said levers which is offset toward an inner edge of said first end portion; and further including hinge means connected to a portion of each of said levers which is offset toward an outer end of said first end portion, said hinge means respectively joining said first and second levers to said first and second legs of said support element.

* * * * *